United States Patent
Surette

(10) Patent No.: US 7,376,415 B2
(45) Date of Patent: May 20, 2008

(54) SYSTEM AND METHOD FOR OFFERING PORTABLE LANGUAGE INTERPRETATION SERVICES

(75) Inventor: Craig Michael Surette, Yorba Linda, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 10/618,150

(22) Filed: Jul. 10, 2003

(65) Prior Publication Data

US 2004/0014462 A1    Jan. 22, 2004

Related U.S. Application Data

(60) Provisional application No. 60/395,963, filed on Jul. 12, 2002.

(51) Int. Cl.
  *H04M 3/00* (2006.01)
(52) U.S. Cl. .............. 455/418; 455/405; 455/406; 455/407; 379/114.01; 379/132; 379/111; 379/67.1; 379/88.05
(58) Field of Classification Search ............... 455/405, 455/406, 418, 407; 379/114.01, 132, 111, 379/67.1, 88.05
See application file for complete search history.

(56) References Cited

U.S. PATENT DOCUMENTS

| | | | |
|---|---|---|---|
| 4,445,211 A | 4/1984 | Webber | |
| 4,706,275 A | 11/1987 | Kamil | |
| 4,882,681 A | 11/1989 | Brotz | |
| 5,136,633 A | 8/1992 | Tejada et al. | |
| 5,353,335 A | * 10/1994 | D'Urso et al. | 379/114.2 |
| 5,375,164 A | 12/1994 | Jennings | |

(Continued)

FOREIGN PATENT DOCUMENTS

EP    0 601 710    6/1994

(Continued)

OTHER PUBLICATIONS

Tele-Interpreters (Tele-Interpreters On-call), http://web.archive.org/web/19990128224906/.*

(Continued)

*Primary Examiner*—Duc M. Nguyen
*Assistant Examiner*—Khai Nguyen
(74) *Attorney, Agent, or Firm*—Patent Ingenuity, P.C.; Samuel K. Simpson

(57) ABSTRACT

Language interpretation for users includes a portable system for providing access to interpretation services, such as a prepaid, debit or credit card for the user. The prepaid card has a number of minutes of language interpretation service associated with it in addition to a number of minutes of telephone time. A telephone number to call is printed on the card for language interpretation services. Minutes or other unit of measure are deducted from the card as used for the interpretation. The cards are language specific, and the telephone number printed on the card is specific to a certain language. The service can be part of telephone service or more especially part of a mobile telephone service. The mobile telephone has a number of minutes of language interpretation service associated with it in addition to a number of minutes of telephone time. A telephone number is programmed to call the language interpretation services.

11 Claims, 5 Drawing Sheets

Figure 3A:
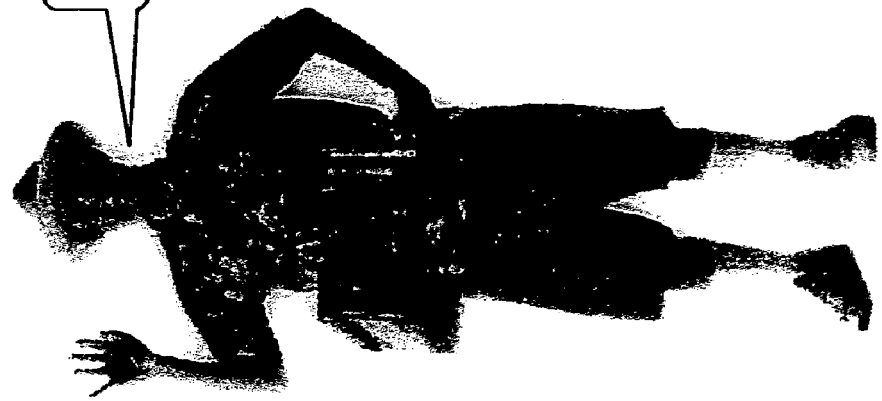

"Instant Language Access from Anywhere in the World"

Language Line Services – Prepaid Card

| Language Coverage for Unparalleled Traveler Peace of Mind | Service Description | Traveler Benefits | Travel Guard Partner Benefits |
|---|---|---|---|
| "Pocket Interpreter™" Language Coverage<br><br>Travelers need help communicating while abroad. Today's coverage extends only to "emergency situations" through insurance providers. Now, Language Coverage can enable travelers to communicate while on travel from anywhere in the world in any situation. From banking transactions to border issues, and from in-country directions to communication requirements with locals, English-speaking travelers can now get the assistance they need. Pocket Interpreter™ allows travelers to access 140 languages 24/7 for any reason. With interpreter access time of less than seconds, Pocket Interpreter™ provides language coverage and unparalleled traveler assurance. | • Language Coverage – an opt-in feature available through travel insurance application forms and 1-800 numbers<br>• "Communication Peace of Mind" for leisure and business travelers while abroad<br>• Value-add of instant access to live interpreters 24/7, connect time of seconds directly through Travel Guard phone lines<br>• Services available through pre-travel sign up<br>• Sold through existing ACE / Travel Guard channels including travel agents, airport terminals, currency exchanges and points of departure from the US | • Peace of mind assurance of instant language assistance from anywhere in the world<br>• Addresses communication needs not currently covered<br>• Banking transactions<br>• Border issues<br>• Hotel assistance<br>  • General health questions and non-emergency assistance<br>• Local directions<br>• General assistance from locals<br>• Local customs and etiquette<br>• Communication with merchants and business people | • Value-add feature that compliments existing "emergency situation" coverage<br>• Incremental revenue from each applicant through this innovative new opt-in feature<br>• Available for US travelers going abroad through existing channels of distribution |

U.S. PATENT DOCUMENTS

| | | | |
|---|---|---|---|
| 5,392,343 A * | 2/1995 | Davitt et al. | 379/265.12 |
| 5,426,706 A | 6/1995 | Wood | |
| 5,509,060 A | 4/1996 | Hall et al. | |
| 5,544,229 A | 8/1996 | Creswell et al. | |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,825,863 A | 10/1998 | Walker | |
| 5,844,972 A | 12/1998 | Jagadish et al. | |
| 5,875,422 A * | 2/1999 | Eslambolchi et al. | 704/3 |
| 5,884,246 A | 3/1999 | Boucher et al. | |
| 5,960,070 A | 9/1999 | O'Donovan | |
| 5,970,124 A | 10/1999 | Csaszar et al. | |
| 5,991,748 A * | 11/1999 | Taskett | 705/41 |
| 6,038,292 A * | 3/2000 | Thomas | 379/88.06 |
| 6,069,939 A * | 5/2000 | Fung et al. | 379/67.1 |
| 6,097,806 A | 8/2000 | Baker et al. | |
| 6,115,458 A * | 9/2000 | Taskett | 379/114.2 |
| 6,134,306 A | 10/2000 | Lautenschlager et al. | |
| 6,137,872 A | 10/2000 | Davitt et al. | |
| 6,161,082 A | 12/2000 | Goldberg et al. | |
| 6,205,215 B1 | 3/2001 | Dombakly | |
| 6,208,851 B1 * | 3/2001 | Hanson | 455/405 |
| 6,227,972 B1 | 5/2001 | Walker et al. | |
| 6,229,879 B1 * | 5/2001 | Walker et al. | 379/88.01 |
| 6,246,755 B1 | 6/2001 | Walker et al. | |
| 6,263,058 B1 | 7/2001 | Lautenschlager et al. | |
| 6,289,088 B1 * | 9/2001 | Bruno et al. | 379/143 |
| 6,292,769 B1 | 9/2001 | Flanagan et al. | |
| 6,301,566 B1 * | 10/2001 | Costello | 705/26 |
| 6,320,947 B1 | 11/2001 | Joyce et al. | |
| 6,333,976 B2 | 12/2001 | Lesley | |
| 6,337,903 B1 | 1/2002 | Manner | |
| 6,363,411 B1 | 3/2002 | Dugan et al. | |
| 6,381,316 B2 | 4/2002 | Joyce et al. | |
| 6,502,745 B1 | 1/2003 | Stimson et al. | |
| 6,507,644 B1 | 1/2003 | Henderson et al. | |
| 6,597,765 B1 * | 7/2003 | Ksiazek | 379/88.06 |
| 6,690,932 B1 | 2/2004 | Barnier et al. | |
| 6,760,411 B2 | 7/2004 | Dybedokken et al. | |
| 6,795,532 B1 | 9/2004 | Gross et al. | |
| 6,801,602 B2 | 10/2004 | Glossbrenner | |
| 6,826,269 B2 | 11/2004 | Afana | |
| 6,856,674 B1 * | 2/2005 | De Trana et al. | 379/114.2 |
| 6,907,256 B2 | 6/2005 | Hokao | |
| 6,920,487 B2 | 7/2005 | Sofer et al. | |
| 6,950,506 B2 | 9/2005 | Ruckart et al. | |
| 6,963,557 B2 | 11/2005 | Knox | |
| 6,985,850 B1 | 1/2006 | Scanlan | |
| 6,999,758 B2 | 2/2006 | Pence et al. | |
| 7,006,604 B2 | 2/2006 | Engelke | |
| 7,068,668 B2 | 6/2006 | Feuer | |
| 7,110,512 B2 | 9/2006 | Maropis et al. | |
| 7,171,348 B2 | 1/2007 | Scanlan | |
| 7,212,802 B2 | 5/2007 | Rodriguez | |
| 2001/0000777 A1 * | 5/2001 | McGregor et al. | 455/406 |
| 2001/0024491 A1 | 9/2001 | Walker | |
| 2001/0032878 A1 | 10/2001 | Tsiounis et al. | |
| 2001/0034599 A1 | 10/2001 | Kage et al. | |
| 2002/0046035 A1 | 4/2002 | Kitahara et al. | |
| 2002/0069048 A1 | 6/2002 | Sadhwani et al. | |
| 2002/0069067 A1 | 6/2002 | Klinefelter et al. | |
| 2002/0097854 A1 * | 7/2002 | Bauer | 379/144.01 |
| 2002/0126810 A1 * | 9/2002 | Hannu | 379/114.01 |
| 2002/0152063 A1 | 10/2002 | Tokieda et al. | |
| 2002/0169592 A1 | 11/2002 | Aityan | |
| 2002/0181669 A1 | 12/2002 | Takatori et al. | |
| 2002/0193983 A1 | 12/2002 | Tokieda et al. | |
| 2003/0008639 A1 | 1/2003 | Kanegae | |
| 2003/0076934 A1 | 4/2003 | Albal et al. | |
| 2003/0086544 A1 | 5/2003 | Ruckart et al. | |
| 2003/0086548 A1 | 5/2003 | Nelson | |
| 2003/0095542 A1 | 5/2003 | Chang et al. | |
| 2003/0144912 A1 | 7/2003 | McGee | |
| 2003/0149557 A1 | 8/2003 | Cox et al. | |
| 2003/0154122 A1 | 8/2003 | Jackson, Jr. et al. | |
| 2003/0158722 A1 | 8/2003 | Lord | |
| 2003/0163300 A1 | 8/2003 | Kasvand et al. | |
| 2004/0014462 A1 | 1/2004 | Surette | |
| 2004/0092293 A1 | 5/2004 | Lee et al. | |
| 2004/0128139 A1 | 7/2004 | Ilan et al. | |
| 2004/0165579 A1 | 8/2004 | Mandle | |
| 2004/0267538 A1 | 12/2004 | Obuchi et al. | |
| 2005/0122959 A1 | 6/2005 | Ostrover et al. | |
| 2005/0129215 A1 | 6/2005 | Parker | |
| 2005/0149335 A1 | 7/2005 | Mesbach et al. | |
| 2005/0152530 A1 | 7/2005 | Pence et al. | |
| 2005/0209859 A1 | 9/2005 | Tenembaum et al. | |
| 2005/0216252 A1 | 9/2005 | Schoenbach et al. | |
| 2005/0261890 A1 | 11/2005 | Robinson | |
| 2005/0272414 A1 | 12/2005 | Vallarino | |
| 2006/0026001 A1 | 2/2006 | Bravin et al. | |
| 2006/0126821 A1 | 6/2006 | Sahashi | |
| 2006/0165225 A1 | 7/2006 | Sahashi | |
| 2007/0106569 A1 | 5/2007 | McQuaide, Jr. et al. | |

FOREIGN PATENT DOCUMENTS

| | | |
|---|---|---|
| EP | 1 041 801 A2 | 10/2000 |
| EP | 1 545 110 | 6/2005 |
| EP | 1 545 111 | 6/2005 |
| JP | 2001 313721 | 11/2001 |
| JP | 2002 073783 | 3/2002 |
| JP | 2002 142024 | 5/2002 |
| JP | 2002 152387 | 5/2002 |
| JP | 2002 163400 | 6/2002 |
| JP | 2002 237897 | 8/2002 |
| JP | 2002 244842 | 8/2002 |
| JP | 2003 069720 | 3/2003 |
| JP | 2003 110702 | 4/2003 |
| JP | 2003 234833 | 8/2003 |
| JP | 2004 023262 | 1/2004 |
| JP | 2004 260430 | 9/2004 |
| JP | 2005 286979 | 10/2005 |
| KR | 20010086930 | 9/2001 |
| KR | 2002009279 | 2/2002 |
| KR | 20020037192 | 5/2002 |
| RU | 2 143 135 C1 | 12/1999 |
| WO | WO 2004/030330 | 4/2004 |

OTHER PUBLICATIONS

Carey Gillam, "Language Line Gives Guests A Chance To Reach Out Touch A Translator", The Kansas City Business Journal, Aug. 30, 1991, p. 2, vol. 9 No. 50.

(author not indicated), "The Phone Call That Speaks Your Language", Money magazine, Jun. 1991, p. 32, vol. 20 No. 6.

(author not indicated), "News and Reports—AT&T Language Line", Managing Service Quality, 1995, vol. 5 No. 1.

(author not indicated), "NHS Direct Translator—National Health Services", Chemist & Druggist magazine, Sep. 25, 2004.

Blayne Cutler, "Multilingual Marketers Work For The Police", American Demographics, Jan. 1992, p. 10, vol. 14 No. 1.

(author not indicated), "Telephone Translators Covered In Deal Between SSH And California Company", Hospital Materials Management, Jun. 2002.

Frederick Gabriel, "Providers Say 'Ah', 'Ay' and 'Oy'—Health Care Providers Which Treat Non-English Patients Must Contend With Cultural And Linguistic Challenges", Crain's New York Business, Jan. 26, 1998, 14(4):30.

Brendan B. Read, "Gracias Por Llamar (Thank You For Calling)", Call Center Magazine, Oct. 2003, p. 32, vol. 16 No. 10.

Phil Zinkewicz, "In Any Other Language—Translators Handle Emergency Calls Or Business/Industry Needs", Insurance Advocate, Mar. 8, 2004, p. 2.

Language Lines Services, "Language Line Services Tutorial".

Language Line Services, "Commonly Asked Interpretation Questions And Answers", Jun. 22, 2004.

Language Line Services, "Over-The-Phone Language Interpretation . . . How Does That Work Exactly?", http://www.languageline.com/prod_serv_interp.php, 2 pages.

Tele-Interpreters, "Tele-Interpreters On-Call", http://web.archive.org/web/19990128224906/http://www.teleinterpreters.com/, 8 pages.

Tele-Interpreters, "Over-The-Phone Language Interpretation Services", http://www.teleinterpreters.com/otp_interpretation_services.aspx, 3 pages.

Network Omni, "On-Demand And Global OPI Services. 24/7/365 in 150 Languages", http://www.networkomni.com/opi-offering.asp, 2 pages.

Network Omni, "Translating On Demand In 140 Languages", http://web.archive.org/web/20000308070011/www.networkomni.com/TranslationLine.html, 2 pages.

Fitzgerald, Kate, "AT&T Campaign Touts Translation Service," Advertising Age, v. 62, n. 20, p. 18, May 13, 1991, Crain Communications, Inc.

Resnick, Rosalind, "Phoning Home: When will International Calling Cards Truly Be Efficient?", International Business, v. 5, n. 10, pp. 64-65.

* cited by examiner

"Instant Language Access from Anywhere in the World"

Language Line Services – Prepaid Card

| Language Coverage for Unparalleled Traveler Peace of Mind | Service Description | Traveler Benefits | Travel Guard Partner Benefits |
|---|---|---|---|
| "Pocket Interpreter™" Language Coverage<br><br>*Travelers need help communicating while abroad. Today's coverage extends only to "emergency situations" through insurance providers. Now, Language Coverage can enable travelers to communicate while on travel from anywhere in the world in any situation. From banking transactions to border issues, and from in-country directions to communication requirements with locals, English-speaking travelers can now get the assistance they need. Pocket Interpreter™ allows travelers to access 140 languages 24/7 for any reason. With interpreter access time of less than seconds, Pocket Interpreter™ provides language coverage and unparalleled traveler assurance.* | • Language Coverage – an opt-in feature available through travel insurance application forms and 1-800 numbers<br>• "Communication Peace of Mind" for leisure and business travelers while abroad<br>• Value-add of instant access to live interpreters 24/7, connect time of  seconds directly through Travel Guard phone lines<br>• Services available through pre-travel sign up<br>• Sold through existing ACE / Travel Guard channels including travel agents, airport terminals, currency exchanges and points of departure from the US | • Peace of mind assurance of instant language assistance from anywhere in the world<br>• Addresses communication needs not currently covered<br>  • Banking transactions<br>  • Border issues<br>  • Hotel assistance<br>  • General health questions and non-emergency assistance<br>  • Local directions<br>  • General assistance from locals<br>  • Local customs and etiquette<br>  • Communication with merchants and business people | • Value-add feature that compliments existing "emergency situation" coverage<br>• Incremental revenue from each applicant through this innovative new opt-in feature<br>• Available for US travelers going abroad through existing channels of distribution |

FIG. 1

"Instant Language Access from Anywhere in the World"

| Pre-Paid International Card | Service | Traveler Benefits | Carrier Partner Benefits |
|---|---|---|---|
| Combined International-Calling Card / Over-the-Phone Interpretation Card<br><br>*Pre-Paid disposable card that provides attractive international calling rates combined with the communication assurance of instant accessible interpreters from anywhere Telecom Carrier supports access. Whether seasoned international business travelers or retirees venturing overseas for the first time, this card provides great communication service with the peace-of-mind of language access.* | • Pre-paid card<br>• Prime emphasis: International Long Distance (familiar travel product); added feature: communication assurance (premium value-add of instant access to live interpreters 24/7, connect time of ___ seconds)<br>• Two options: opt 1 for international calling; opt 2 to access OPI<br>• Card re-chargeable at premium rate when minutes expire<br>• Serviceable for ___ days from time of purchase | • Attractive international rates<br>• Peace of mind assurance of instant language assistance from anywhere in the world<br>• Bundle feature from name-brand recognized carrier<br>• Low risk to trial – can utilize the LD minutes if OPI not necessary<br>• Low risk to purchase - price point set low ($___) for maximum opt-in | • Value-add feature that enhances sales of core International Pre-Paid Cards<br>• Feature opens "perk and incentive" aspects of lucrative international travel segment; premium give-away products<br>• Additional SKU for existing travel Vertical Market supported by Telecom Carrier<br>• Available for US travelers going abroad (points of distribution in the US and abroad)<br>• Available in select languages to foreigners traveling to US (in-language automated front-end; points of distribution abroad and in the US) |

*FIG. 2*

TO PLACE A CALL
Dial the Country access code to reach your interpreter

| | |
|---|---|
| US & Canada | 1-800-537-5831 |
| Mexico | 01-800-024-0025 |
| Mexico Pay Phone | 01-800-639-2880 |
| France | 0-800-904-902 |
| Germany | 0-800-874-6011 |
| Italy | 800-781-786 |
| Spain | 800-981-879 |
| Netherlands | 0800-0249970 |
| Switzerland | 0800-563-336 |
| Korea | 003-00030-812-0330 |
| China | 10-800-120-0488 |
| Japan | 00531-121135 |

Enter the following PIN:
Follow the easy prompts.   6345266384

8003  852   Patent Pending

Este carta no se prohibida venta

Card has no cash redemption value. Non-refundable. Non-transferable. Language Line Services is not responsible for loss, theft, or unauthorized use of this card. Payphone and cellular airtime charges may apply and subject to change. Partial minutes are rounded up to the next whole minute. Additional minutes have been added to this card to allot for hold time. Card will not work from rotary phone Country-specific service subject to change without notice.
For re-charge or Language Line Customer Service call 1-800-360-8213.

This card expires: 90 Days from first use or 12/31/04

Customer Service
1-800-360-8213

*FIG. 3B*

SYSTEM AND METHOD FOR OFFERING PORTABLE LANGUAGE INTERPRETATION SERVICES

RELATED APPLICATIONS

This application claims priority to U.S. Provisional Application No. 60/395,963, entitled "System and Method for Offering Portable Language Interpretation Services", filed on Jul. 12, 2002 which is incorporated herein by reference in its entirety.

BACKGROUND OF THE INVENTION

1. Field of the Invention

The present invention relates generally to offering language interpretation services. More specifically, the present invention relates to providing language interpretation services to users through the use of a portable access system.

2. Description of the Background Art

Many travelers find that a major obstacle in traveling abroad is communication in countries where they do not speak the native language.

Previous approaches have been made to provide interpretation services to travelers, however they are not always convenient. Many people purchase foreign language dictionaries for the purpose of interpretation when traveling abroad, however this approach is certainly awkward in attempting a conversation and quite time consuming to use. It also adds to what a traveler has to carry around on a daily basis. Electronic devices are also available that offer interpretation based on what is typed on a small keyboard. This too can be time consuming and is not always convenient.

There is a also a system which is known as Language Line Services™ (LLS). This does provide interpretation services over the phone to businesses and some persons who are set up with pre-authorized accounts and accessible from only the US, UK, Canada and Japan. If used by consumers and with a requirement from a broad range of countries, a credit card would be required, and the access time and approval of credit card terms inserts a delay which is often unacceptable. Moreover the credit card model for payment is not an optimum business model. It is thus limited in use and is not a prepaid service.

It is therefore an object of the present invention to provide a method for providing interpretation services to users generally, for instance travelers that is convenient and can be accessed in a very short time.

SUMMARY OF THE INVENTION

The system and method of the present invention allows for access to live interpretation services anywhere in the world. Specifically, the method involves providing over the phone interpretation services to a user such as a traveler through the use of a portable system, for instance a pre-paid card, or other prepaid medium. Quality, live, professional language interpretation, as is offered by the present invention, can turn a barely discernable communication into a clearly understood conversation between people of different languages. Therefore, the method of the present invention provides the user peace of mind assurance of instant language assistance from anywhere in the world by offering professional language interpretation through a service using a portable phone or a landline phone wherein the necessary criteria are met to provide essentially instantaneous interpretation. Access to a designated interpreter can be for instance through a pre-paid calling card. The language interpretation service is available in over 150 languages.

Accordingly, in an exemplary embodiment of the present invention, a pre-paid language interpretation card is given to a user, for instance a traveler prior to departure on their trip or at the point or arrival. The card has a telephone number printed on it which allows the traveler access to language interpretation services over the phone from anywhere in the world. The telephone number printed on the card is preferably an 800 International number or a series of international toll free numbers compatible with countries around the world. The card is pre-paid in that it provides a predefined amount of over the phone language interpretation service to the traveler. The predefined amount generally corresponds to the amount of money that has been deposited "on the card". The predefined amount may be measured by the minute or unit of time The pre-paid card is similar in size and appearance to a credit card and can easily be placed in a wallet or pocket, and is therefore convenient to carry at all times. The card may have a code printed on it that is used to identify it from others, and used when deducting time or money from the card/account.

The card is re-chargeable. When the pre-paid amount associated with the card runs out, or comes close to being gone, the traveler can purchase additional time on the card with their own credit card. Minutes may have an expiration date.

In one embodiment, the card offers the language interpretation service alone. In an alternative embodiment, the pre-paid card has a dual purpose, offering international long distance calling minutes in addition to the pre-paid over the phone language interpretation service.

Never before has a pre-paid live language interpretation service been offered. The pre-paid language card has many benefits. The pre-paid language card can be used for emergency assistance in foreign countries. For example, a traveler can use the pre-paid card to access interpretation services in a medical emergency. The method of the present invention may be of great assistance in life threatening situations where doctors or nurses and patient cannot communicate. Using the pre-paid card of the present invention allows for almost immediate access to language interpretation over the phone. The pre-paid card could also be used to access interpretation services to aid in border, customs, and immigration issues. The pre-paid card can certainly be used by the business traveler who needs assistance in business communication for clarity, precision, and etiquette. The pre-paid language interpretation service is conveniently used by a traveler who need to clarify directions when traveling in a foreign country, or otherwise to communicate with locals for any reason in their native language. Generally, the prepaid card and method of the present invention eliminates worry and risk for the English-speaking Traveler.

A distinguishing feature of this embodiment is that the card is universally compatible with phone technology, including but not limited to wire line, payphone, cellular and satellite telecommunications technology. The international toll free and direct-dial numbers are selected to be compatible independent of technology and the call's country of origin.

In another embodiment of the present invention, interpretation services are accessed through a mobile phone that the traveler is given or has available. It is known that mobile phones used in the United States do not often work in foreign countries. Mobile phones are often available for rent in foreign countries. Therefore, in an alternative embodiment of the present invention, pre-paid interpretation services are offered through a mobile phone. Like other mobile phones which may have a button dedicated to emergency assistance, this customized mobile phone for interpretation might have a button dedicated to language interpretation services, providing immediate connection, without dialing a number manually. In this embodiment, the person using the phone may not need to provide any type of codes or identifying information, since that information could be detected from the phone itself.

The present invention also has implications on the way that travel agents or travel related companies do business. For example, the card can be offered to the traveler or included as part of a travel package by their travel agent. It is foreseen that the pre-paid language cards of the present invention would be offered by airlines, travel agencies, car rental companies, and travel insurance agents, as peace of mind to those planning travel abroad. The card can additionally be purchased by the traveler, perhaps in a vending machine in an airport or other location, at a hotel, tourist attraction, or just about any other convenient location.

An advantage of the present invention over prior art methods is that it enables access to over the phone language interpretation services while avoiding integration issues with telecom or wireless carriers. By utilizing the prepaid card, international wireless and telecom companies forego the requirement to integrate billing systems and functionality onto their systems and platforms. The result: utilizing prepaid in a unique way that delivers "Risk-free" assessment of additional telecom features (in this case, a voice feature that pertains to interpretation). This approach therefore enables the client to assess new opportunities without the capital outlay or integration issues that have been barriers to the industry to date.

Another embodiment of this card is for alternative payment methods in which to access interpretation, whether domestically or internationally. A Debit Card configuration is used which allows users to enjoy interpreter access as described and at pre-defined rates, but to have the payment debited automatically from the user's bank account or alternate source of funding. Pre-authorized usage cards operate similarly to credit card payments. Users call Language Line Services to "activate" the cards including the selection of credit card payment method. Per minute and package rates are defined and selected by the user. Rates include both the international long distance and interpretation services combined. The card is therefore unique to the user and payment reflects actual usage, being automatically paid by credit card or debit card in accordance with the activation setup executed by the user.

As such the system provides a portable system wherein the user anywhere can use the pre-determined data which is either prepaid or debited immediately as interpretation is being effected through the phone system. By using the wireless telephone with any one or more of these payment systems the portability is increased.

Applications for non-travelers seeking interpreters for communication purposes whether abroad or at home are also within the scope of the invention. The same application holds true for domestic interpretation, assisting non-English speaking residents to communicate in English-speaking countries (i.e. Spanish residents seeking a communication tool for use within the United States). The same is true of all language-based solutions in any country delivered through the convenience of card access.

An additional application is for business or personal clients seeking to meter or limit their spending of Over-the-Phone Interpretation (OPI) services. Use of card formats limits use to the amount of time loaded or authorized, thereby making the card a cost containment tool Yet a further application is a portable system, where for instance a card delivery is used that also makes interpreter access viable for educational applications. Predefined units of interpreter access make cards an educational tool, allowing 1) language students to practice their understanding of various languages and can do so regardless of geographic locale or time; 2) clearer understanding for Limited English Speakers (LEPs) to gain interpreter assistance for educational assistance regardless of locale or time. Further, commercial applications have been identified in military, legal, healthcare and emergency services environments where authorized access to interpretation services with predefined units of usage are required.

DRAWINGS

Figure 4:
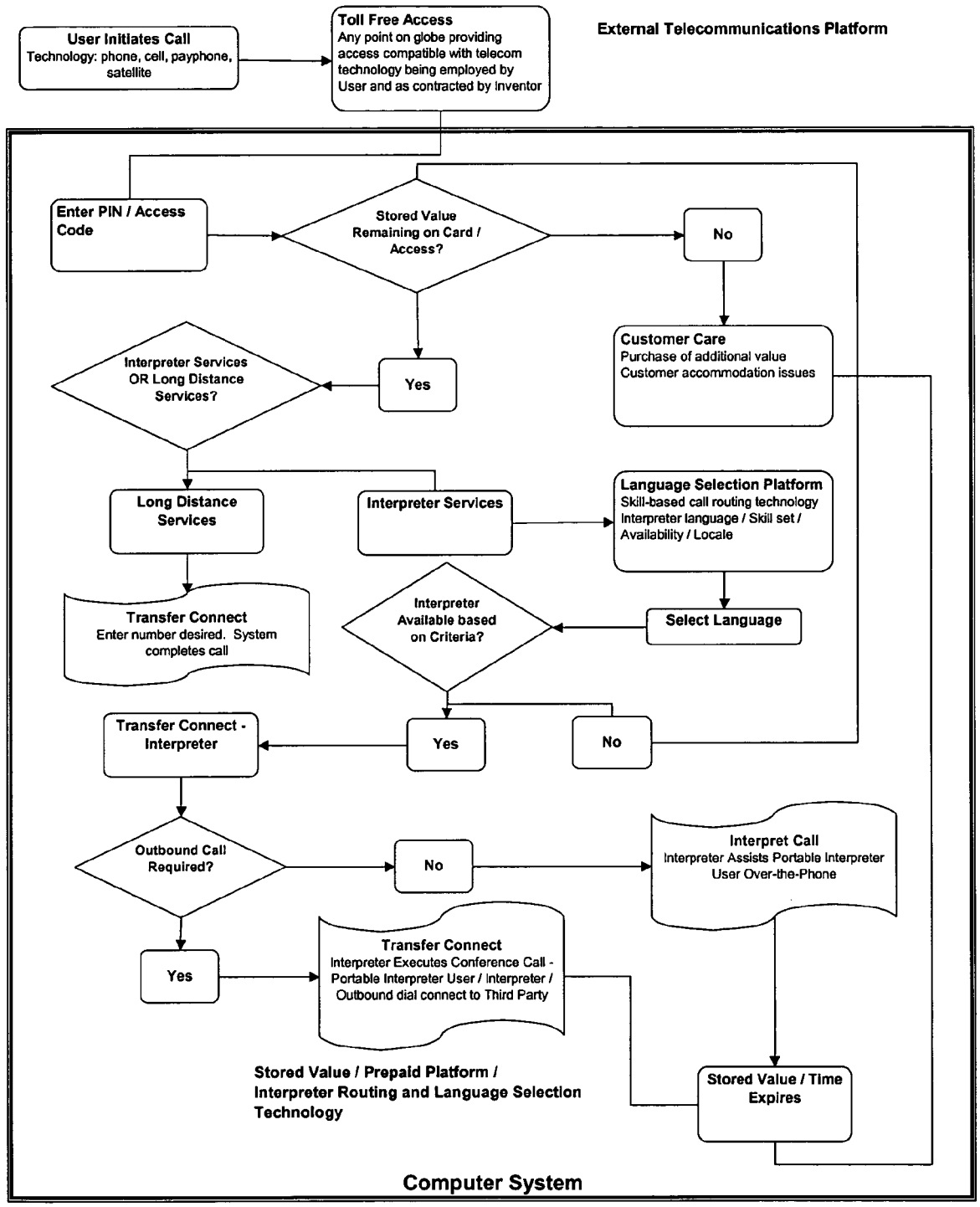

FIG. 1 is a table illustrating the Instant Language Access from Anywhere in the World, relating the Pre-Paid international Card, the Service, the Traveler Benefits, and the Carrier Partner benefits FIG. 2 is a is a table illustrating the Instant Language Access from Anywhere in the World, relating the Language Coverage for Unparallel Traveler Peace of Mind, the Service Description, the Traveler Benefits, and the Travel guard Partner Benefits FIGS. 3a and 3b are front and back of a card in accordance with the invention FIG. 4 is a flow diagram of the system in relation to media (data, paper, a card, a mobile phone) accessed by the used interfacing with computer system for obtaining the interpretation services

DESCRIPTION OF THE PREFERRED EMBODIMENTS

Descriptions of exemplary embodiments of the invention are provided. It is to be understood that other embodiments may be utilized and structural and functional changes may be made without departing from the respective scope of the present invention.

There is provided a method and system of offering prepaid language interpretation service to users such as travelers. Although the invention is described largely in reference to a traveler, the invention is not intended to be so limited. A method of offering a portable language interpretation service to users, involves offering the user a card, the card having access to a of units of language interpretation service. There is a telephone number to call on the card for said language interpretation services. Language interpretation services are provided to the user at the telephone number specified on the card. Units are accessed in relation to the card as units are used for the interpretation.

The user can use a mobile telephone having access to a language interpretation service associated with it. A telephone number is called for accessing the telephone to the language interpretation service.

The invention is also directed to the integration of the language interpretation service into the telephone services provided by the telephone company, preferably the mobile telephone company.

There can also be a medium which is a card for a user. The card has data relating to a number of units of language interpretation service associated with it, and a telephone number to call on the card for said language interpretation services. The card has data for providing access to language interpretation services to the user at the telephone number specified on the card. A computerized system permits a relationship with the card data for assessing minutes or other unit of measure from data related to the card as units are used for the interpretation service.

A portable language interpretation service to users includes offering the user a through a telephone company access to units of language interpretation service. There is a predetermined number to call for said language interpretation services. Language interpretation services are provided to the user at the predetermined number; and units are charged in relation to units used for the interpretation. The telephone company is ideally a mobile telephone company, and the user accesses the telephone company through a mobile telephone.

The user can be provided with one of a prepaid calling card, a debit card or a credit card to effect payment for the units to the language interpretation service. Alternatively the user is charged on account to a predetermined subscribers telephone account to effect payment for the units to the language interpretation service.

In one form the user or traveler is offered a card to carry with them. The card has a number of units, usually time based and usually minutes, of language interpretation service associated with it. In some cases there is in addition a number of units or time based element such as minutes of telephone time. There is also a telephone number to call printed on the card for said language interpretation services.

Language interpretation services are provided to the traveler at the telephone number specified on the card. As used, a system deducts minutes or other unit of measure from the card as used for the interpretation and/or the telephone time.

In some cases the card is a combination card and can be used for either telephone services or the interpretation services or the interpretation services co-jointly with the telephone services.

The card can be language specific, and the telephone number printed on the card is specific to a certain language. In other cases, the telephone number offers a general language interpretation service, and the user must specify what language is desired once they call. Commercially there is the step of offering the user the card by including the card in a travel package. This can include travel assurance packages, such as an air travel ticket; travel insurance; and pre-paid interpretation services through to a long-distance "calling" card medium. It can further include accident insurance; car rental; and accommodations.

In another form, instead of a card the data relating to the service is a mobile telephone. The mobile telephone has a number of minutes of language interpretation service associated with it in addition to a number of minutes of telephone time. There is a telephone number to call programmed into the telephone for speed dial connecting to obtain language interpretation services. The telephone number to call can be programmed into the phone and be accessed by pressing a single button on the mobile phone. The commercialization of the interpretation feature for the wireless carrier is the addition of the interpretation feature, and integrated the interpretation service onto their service platform. Wireless provider feature is a pay as you go model and embedded into the format of the wireless service used by a wireless subscriber. IN some situations especially in the wireless phone mode the interpretation service is available due to the prepaid card, debit card, or ongoing service access contracted in advance by the user and the wireless telephone company The card or telephone is rechargeable in the sense that extra commercial credit is applied to the dedicated data or telephone number or dedicated telephone to provide additional minutes for at least one of the language interpretation service or the telephone time. The language interpretation service access should expire after a predetermined time from an initial activation.

As such the system provides for on-demand pre-paid language interpretation service. A user has, is given or purchases prepaid access data. The data has a number of minutes of language interpretation service associated with it in addition to a number of minutes of telephone time. The user calls the telephone number, and the system assesses the interpretation minutes available to the user associated with that data. If there is a sufficient amount of interpretation time available; the user is essentially instantaneously connected to an interpreter to provide essentially instantaneous interpretation services.

By the term "essentially instantaneous", there is meant to be a situation where a readily available bank of interpreters established by a provider is on standby, wherein callers requesting interpretation services can be immediately or within less than 30 seconds connected to the selected interpreter as soon as the validation has occurred that the medium or data has time available or prepaid for that interpretation.

There is thus provided a medium for offering pre-paid language interpretation service to users in combination with telephone time. The medium can comprise a card for a user to carry with them, the card having data relating to a number of minutes of language interpretation service. Additionally there can be associated with it in addition to a number of minutes of telephone time, and a telephone number to call printed on the card for said language interpretation services. The card has data for providing access to language interpretation services to the user at the telephone number specified on the card.

A computerized system permits a relationship with the card data for deducting minutes or other unit of measure from data related to the card as time is used for at least one of the interpretation time or telephone time.

In a specific form, the medium can be a record of the data relevant to the particular user, and telephone number, and the language interpretation service.

A mobile telephone may contain that data or the data can be contained no a prepaid card, such as a telephone card. In the telephone format, the telephone, namely a mobile, cellular or wireless telephone, can also be enabled to conduct telephoning to numbers unrelated to the interpretation service.

A traveler's language assistance/assurance card facilitates business communication, convenience, and peace of mind. A pre-paid card (which can be distributed as a free promotion or be for re-sale is provided for or to travel customers. Access to the language interpretation service can be through a 800 International Number or some other toll free number. Over-the-phone interpretation only or International Long Distance (LD) and Over the Phone Interpretation (OPI)are combined on a single card.

The card can be re-chargeable for additional OPI or LD. The re-charge can be effected via a credit card. Preferably there is time limit associated with the active life of the card. Ideally this can be 6 months after activation.

The card provides the benefit of live interpreters to English speaking individuals or others traveling abroad to foreign-language countries or to foreigners traveling to the US. It can have many uses, for instance, Emergency Assistance; to aid in border, customs and immigration issues; assist in business communication for clarity, precision and etiquette; help clarify directions; or communicate with locals for any reason in their native language; eliminate worry and risk for the English-speaking Travelers.

This card is a pre-paid language assistance card. The card can be a combination card and either over-the-phone interpretation only or International Long Distance and OPI combined. A logo/marketing message could be on the card as well as Language Line Services™

Prepaid OPI cards address travelers concerned with the risks of being unable to communicate while abroad. Cards are positioned as a compliment to international long distance (LD) cards and deliver interpreters from anywhere carrier partner provides LD access. Prepaid OPI card can be configured to be stand-alone card or blended with international long distance. OPI card or portion of the card will expire 6 months or some defined period of time after activation and have a preset amount of OPI minutes. Voice feature can be added to the card and can be co-branded, for instance, the name of card (i.e. "Travel Interpreter").

The method and system of the invention provides a "Communication assurance" for travelers. It addresses a perceived risk of not being able to communicate rather than the actual need of accessing an interpreter. Simplicity of user access based on consumer familiarity of existing prepaid calling card products. To partners, retailers and distributors, the card adds a value-add travel product that generates incremental revenues at attractive margins.

1. Product Description Configuration 1:

Card users call international 800 line, option for LD or OPI. Set number of OPI minutes per card from abroad. If the minute limit exceeded, carrier partner system allows for card to be re-charged at higher-per-minute-rate. The card is disposable; expires 6 months after activation.

Configuration 2:

Add-on feature to calling card platform. Card users call international 800 line, option for LD or OPI. Minutes decrement at set rates depending upon which option (int'l minutes or OPI). If minute limit exceeded, carrier partner system allows for card to be re-charged at higher-per-minute-rate. Card is disposable; expires xx days after activation.

All published 150 languages of Language Line Services, Inc. (LLS) are available for the card. This may be augmented or modified.

An example for Live Cards, is that revenue is recognized at time of sale from Carrier Partner or direct LLS sales organization. Per-minute recharge revenue are collected monthly from Partner Carrier. The ability to track cards and authenticate revenue received for live/active cards is attained.

An example for In-Field Activated Cards, revenue is generated at Point-of-Sale. Cards are activated in-field (carrier service). System integration is required to activate OPI access in parallel with receipt of revenue. Per-minute recharge revenue is collected monthly from the Partner Carrier. The ability to track cards and authenticate revenue received for live/active cards is attained.

For users this invention provides a "Communication assurance". Simplicity of user access through the portability of the access media, and as further supplemented by the wireless telephone is based on consumer familiarity of prepaid products, or services such as a debit or credit authorized authority with a telephone company providing access to the interpreter service or as a pre-arranged contract associated with the wireless access. To the Wireless Partner there is a lucrative revenue opportunity without infrastructure obstacles or integration costs. Likewise, for instance, the provider of language learning, can also earn revenue since the student can use the portability accessible interpretation facility to access language lessons and exercise the foreign language. In one embodiment of the invention, as a retail card, English is the base language. There can be a retail for International Wireless Carrier. International LD is not included. A client dials "for-fee" international number to LLS (provided by Partner). The card has a branded front-end greeting; "promotional pitch" capability available via recorded messaging. The User enters Prepaid Card number and PIN. The user utilizes/trials OPI. The card expires at a predetermined time, for instance x months, after initiation.

In another embodiment there is an English Service for US International Wireless Users Abroad. Cards are sold from Wireless Carrier to subscriber; and cards can be physical or virtual. Users use the card based on Wireless Partner access and "for-fee" airtime back to the US. A User calls Wireless Partner's for-fee phone number. Caller enters LLS standard automated front-end. The User enters Card number and PIN on LLS front-end to access OPI. The Caller then uses some or all of the prepaid OPI minutes. At 1 minute remaining, system whispers warning. At expiry of minutes, call routed to EAP to take credit card information for additional minutes. If client elects additional minutes and credit card information taken, caller is re-connected to the interpreter. Otherwise, the call is terminated.

Cards for Foreign Nationals

The international traveler concerns about inability to communicate while abroad is satisfied. The prepaid card program is for foreign nationals visiting the US and other English-speaking countries to provide instant interpreter access. To the international traveler there is "Communication assurance" for foreign national travelers while in the US. There is simplicity of user access based on consumer familiarity of prepaid products.

1. Product Description

The Retail Card uses the foreign languages as base languages. These are, for instance: Spanish, Japanese, German, French, Portuguese, Italian, Cantonese/Mandarin. These are the Top visitors to the US. Source: Travel Industry Association of America, 2000. The card provides domestic LD to LLS. Travel industry distributors offer Prepaid In-Language OPI cards at POS. Top 7 languages offered on cards, all printed in-language. Cards offer "International access to interpreters from anywhere in the United States/Canada/UK/Australia." Physical card (PET) conveys Card & PIN numbers as well as instructions (for instance the Sprint "Pocket Interpreter")

The Client dials in-language LLS 1-800 number. In-language front-end greeting; "promotional pitch" capability available via recorded messaging. The User enters Prepaid Card number and PIN, and utilizes OPI. Cards expire at x months User calls LLS on in-language 1-800 line. Caller enters LLS automated front-end in-language. User enters Card number and PIN on LLS front-end to access OPI. Caller then uses some or all of the prepaid OPI minutes. At 1 minute remaining, system whispers warning (in-language). At expiry of minutes, call routed to EAP with interpreter on-line to take credit card information for additional minutes. If client elects additional minutes and credit card information taken, caller resumes with interpreter. Otherwise, call terminated.

Cards are sold and channeled to travel industry, travel insurance entities and the like.

The description of exemplary and anticipated embodiments of the invention have been presented for the purposes of illustration and description. They are not intended to be exhaustive or to limit the invention to the precise forms disclosed. Many modifications and variations are possible in light of the teachings herein.

I claim:

1. A method of offering a portable live language interpretation service to a user, the method comprising:

offering the user a card to carry, the card having a predetermined amount of units of live language interpretation service associated with the card, a predetermined amount of units of telephone service associated with the card, and a telephone number to call printed on the card for said language interpretation services;

providing a language interpretation service to the user at the telephone number specified on the card;

deducting one or more units from the predetermined amount of units of live language interpretation service associated with the card based on an amount of units of language interpretation service provided to the user; and deducting one or more units from the predetermined amount of units of telephone service associated with the card based on an amount of units of telephone service provided to the user for a duration of a telephone call in which the live language interpretation service is provided.

2. The method of claim 1 wherein the card is language specific, and the telephone number printed on the card is specific to a certain language.

3. The method of claim 1 further comprising requesting, during the telephone call, the user to specify the language for the language interpretation service.

4. The method of claim 1 wherein the offering the user the card is effectuated by including the card in a commercial package.

5. The method as claimed in claim 1 wherein the card is rechargeable to provide additional minutes for at least one of the language interpretation service or the telephone time.

6. The method as claimed in claim 1 wherein language interpretation service access expires after a predetermined time from an initial activation.

7. A method of offering a portable live language interpretation service to users, the method comprising:

having the user use a mobile telephone, the mobile telephone having a predetermined number of units of live language interpretation service, a predetermined number of units of telephone service, and a telephone number to call programmed into the telephone for said language interpretation services;

providing a language interpretation service to the user as programmed into the telephone;

deducting one or more units from the predetermined number of units of live language interpretation service from the mobile telephone based on an amount of units of language interpretation service provided to the user; and deducting one or more units from the predetermined number of units of telephone service from the mobile telephone based on an amount of units of telephone service provided to the user for a duration of a telephone call in which the live language interpretation service is provided.

8. The method of claim 7 wherein the telephone number to call is programmed into the phone and accessed by pressing a single button on the mobile telephone.

9. The method as claimed in claim 7 wherein the mobile telephone is rechargeable to provide additional minutes for at least one of the language interpretation service or the telephone time.

10. The method as claimed in claim 7 wherein language interpretation service access expires after a predetermined time from an initial activation.

11. A medium for offering portable live language interpretation service to users, the medium comprising:

a card for a user, the card having a first data set relating to a predetermined number of units of live language interpretation service associated with the card, a second data set related to a predetermined amount of units of telephone service associated with the card, and a telephone number to call on the card for said language interpretation service;

the card having an access data set for providing access to said language interpretation service to the user at the telephone number specified on the card; and a computerized system that deducts one or more units from the predetermined amount of units of live language interpretation service associated with the card in the first data set based on an amount of units of language interpretation service provided to the user and deducts one or more units from the predetermined amount of units of telephone service associated with the card in the second data set based on an amount of units of telephone service provided to the user for a duration of a telephone call in which said live language interpretation service is provided.

* * * * *